May 28, 1935.  J. A. KINNEY  2,003,084

METHOD OF MAKING NUT BLANKS

Filed Dec. 13, 1933

Inventor

James A. Kinney.

By R. S. A. Dougherty.

Attorney

Patented May 28, 1935

2,003,084

UNITED STATES PATENT OFFICE 2,003,084

METHOD OF MAKING NUT BLANKS

James A. Kinney, Lebanon, Pa., assignor to Bethlehem Steel Company, a corporation of Pennsylvania Application December 13, 1933, Serial No. 702,117

8 Claims. (Cl. 10—86)

This invention relates to improvements in the art of making nut blanks, and more specifically to a new method of making brightly finished nut blanks direct from accurately hot rolled stock.

Heretofore, in making smoothly finished nuts from ordinary bar stock, it has been necessary to pickle the bar to remove the scale, then cold draw or cold roll the bar to the required size, and then straighten the bar. The bar was then cut and drilled so as to produce nut blanks which were subsequently threaded to form the finished nut.

The nuts produced by this prior method do not have the good physical qualities of nuts made from a bar which has not been cold drawn or cold rolled, as will hereafter be explained. Neither does a nut made by this prior method have the clean, unmarked and bright appearance as a nut made by this new method.

To explain more fully the defects of the prior method, it is a known fact that when a bar has been pickled to remove its scale, that the fibrous surface of the bar develops a stained or oxidized appearance after it has been washed, dried and exposed to the atmosphere for a period of time, and that when a bar thus stained is reduced in section by a cold working operation, the stain or oxidization is worked into the bar and becomes a permanent part of the surface of the bar which no subsequent treatment or operation can remove. The result is, the product made therefrom has an impaired or poor appearance. Furthermore, nuts made directly from hot rolled stock are tougher and stronger than those made from cold drawn or cold rolled bars, because hot rolled stock has a highly refined granular structure which can only be produced by working above the critical range, while cold working hardens steel and elongates the crystals, thus setting up strains which further rupture any slight seams in the stock and tend to open up these seams and incipient cracks or other imperfections when the nuts are placed in service. The hot rolled bar also has a much higher true elastic limit.

Briefly stated, my invention comprises making an accurately rolled hexagon bar having shape, size and tolerance characteristics equivalent to a cold rolled or cold drawn bar such as produced by the method disclosed in application Serial No. 645,890, filed Dec. 6, 1932 which has resulted in Patent No. 1,987,324. Straightening the bar if necessary, and removing the scale preferably by sand blasting or other mechanical means so as to avoid staining the bar. Then cutting and drilling the bar to obtain the nut blanks, after which the blanks are given one or more burnishing passes through a die to brighten and smooth up the roughened facets without materially affecting the original granular structure of the metal, and then threading the nut in a usual manner.

An object of my invention is to produce nuts made from a hot rolled bar, which will have smooth, brightly finished wrench faces, free from die scratches and machine collet marks.

Another object of my invention is to produce nuts directly from a hot rolled bar which will have superior physical qualities as compared to nuts made from a cold worked bar, and having all the good qualities as set forth in the first mentioned object.

A further object is to produce nuts having the characteristics mentioned in the preceding objects, at reduced manufacturing cost.

The novel features will be more fully understood from the following description and claims taken with the drawing, wherein Fig. 1 shows portions of a machine for making nut blanks from a bar.

Figure 1:
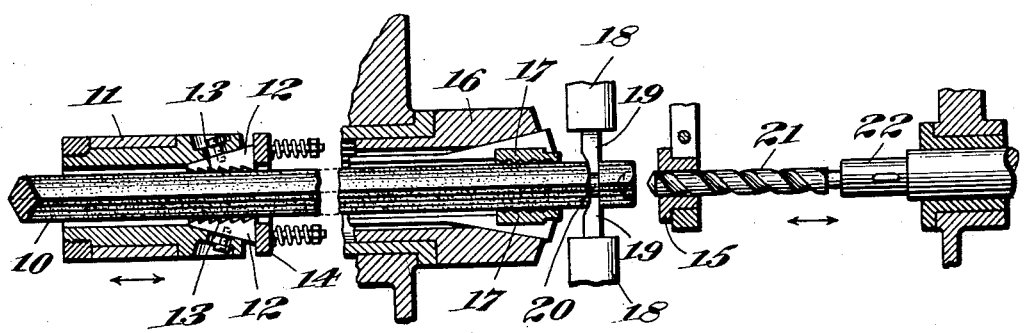

As a means of illustrating my method of producing nut blanks from a bar, reference is made to Fig. 1, in which, numeral 10 represents an accurately rolled hexagon bar free from scale and having the geometrical characteristics of a cold drawn bar of similar size, but slightly larger than the drawn bar for making a nut of the same size as would be produced by the drawn bar. The bar is fed into the machine by the reciprocating action of the stock feeding clutch 11 which is provided with gripping dogs 12 having roughened or serrated clamping faces 13, so as to grip the bar by being forced to their operative positions by means of the spring pressed ring 14. After the bar has been brought up against the stop 15 for limiting the forward movement of the bar, the rotatable chuck 16 automatically engages the bar by means of the serrated collets 17 so as to securely clamp the bar and effect its rotation. The tool stocks 18 carrying cutting and chamfering tools 19 are then closed in on the bar so as to partly sever the bar and form the chamfer, leaving a connecting portion 20 which is of less diameter than the drill or boring tool 21. The tool stocks are then separated and the slidingly mounted spindle 22 carrying the drill is moved toward the work so as to drill the tap hole in the nut blank and at the same time cut away the small connecting portion 20 so as to sever the blank from the bar.

While I have illustrated a particular type of machine for producing nut blanks, it is to be understood that any other type may be used for accomplishing the same result.

Figure 2:
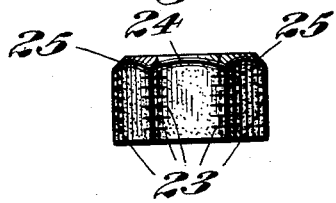
Fig. 2 illustrates a blank produced by the machine shown in Fig. 1.
Figure 3:
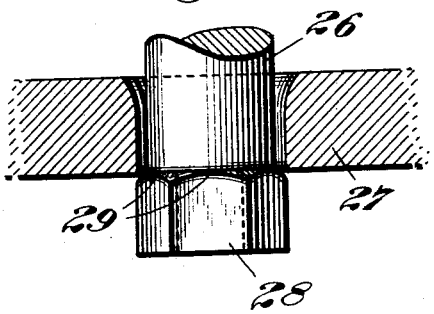
Fig. 3 illustrates the operation of burnishing the blank.

Fig. 2 represents the appearance of the blank nut produced by the machine of Fig. 1. Here, attention is drawn to the collet marks 23 on the facets of the blank. These marks, left by the cutting off and drilling machine, impair the appearance and salability of a nut where good appearance is a factor. The facets of the blank also have a dull, scratchy appearance due to the sand blasting operation. It will also be noted that the nut is chamfered sufficiently so as to provide a small chamfer over the flats, as shown at 24 as well as across the corners 25. Now, in order to give the blank a bright, smooth, particularly fine appearance, and at the same time to remove all tool marks such as produced by the feeding dogs 12 and collets 17, the nut is forced through a suitably shaped burnishing die 27 by means of a round plunger 26 having a diameter smaller than the distance over the flats of the finished blank. By this operation a nut blank is produced having a smooth, bright finish, and free from tool marks as illustrated at 28.

When the blank is forced through the burnishing die, the outside skin of the material will flow unrestrictedly toward the top of the blank so that the tops of the crowns 29 are brought substantially into alignment with the top face of the blank without overflow or finning. This explains the reason for the chamfer over the flats as shown at 24. If the blanks were not sufficiently chamfered, the burnishing operation would leave fins or rough edges at the tops of the crowns 29 due to overflow.

By burnishing the blanks, I obtain a finish equal to that of a cold drawn or cold rolled bar without sacrificing any of the good physical qualities of the hot rolled bar, because the burnishing operation is of less severity than cold drawing or cold rolling a bar to obtain accuracy of shape, size and a similar finish. In burnishing a blank, its sectional reduction is small as compared to cold drawing a bar. Also in burnishing a blank having an axial hole, the metal as a whole has a chance to move toward the hole as well as to flow lengthwise along the surface of the blank, which is impossible when drawing a solid bar. There the metal must be displaced all in one direction which is severe in effect.

By the method above described, nuts of superior finish can be produced free from discoloration and machine tool marks, and of superior physical qualities as compared to nuts made from cold worked stock. Certain economies are effected in the cost of equipment for burnishing as compared to the cost of equipment, material and labor for carrying out an operation such as cold drawing. The loss due to scratched material as sometimes produced by a drawing operation is materially reduced, because by my method imperfections can be confined to individual blanks as compared to a long bar having a scratch extending its full length as is apt to occur in a drawing operation due to grit getting into the die.

Another advantage of my improved method over prior practice, resides in the fact that cold working makes a bar springy which causes it to resist mechanical straightening, making difficult the production of straight bars, while a hot rolled bar is easily straightened, and the burnishing operation does not change the physical properties of the original hot rolled bar as compared to cold drawing or the like.

I also take advantage of the geometrical accuracy and close tolerance size of the bar as rolled by the aforementioned method disclosed in application Serial No. 645,890, thus reducing to a minimum the burnishing necessary to obtain finish, and without depending upon the burnishing operation to correct for discrepancies in shape or size as exists in bars rolled by ordinary methods. Said method of rolling produces stock having a maximum tolerance of $\pm.006''$ which is not obtainable by usual hot rolling methods. Bar stock of this nature, which I term precision stock, is essential to the success of this method for producing nuts having close tolerance specifications and bright finish.

While I prefer to remove the scale from the hot rolled bar by sand blasting, it is to be understood that I may do this by suitable acid treatment, and then sever the blank and burnish it in accordance with my method. This may not produce a nut having exactly the same appearance as that produced by sand blasting, but it will produce a smoothly finished nut free from tool marks and have the same physical qualities as the sand blasted nut, either of which are physically superior to a nut made from cold drawn stock or the like for the reasons heretofore explained.

While I have shown and described my invention in a preferred form, it will be obvious to those skilled in the art that it is not so limited, but is susceptible of various other changes and modifications without departing from the spirit thereof, and I desire, therefore, that only such limitations shall be placed thereupon as are imposed by the prior art, or as, are specifically set forth in the appended claims.

Having thus described my invention, what I claim as new and desire to secure by Letters Patent, is:

1. A method for manufacturing nuts, comprising the steps of rolling a hexagon bar having geometrical and tolerance characteristics equivalent to a cold rolled bar of similar size, removing the scale from the bar, producing drilled nut blanks from said scaled bars, brightly finishing the facets of the blanks by burnishing, and then tapping the blanks.

2. A method for manufacturing nut blanks, comprising the steps of rolling a hexagon bar having geometrical and tolerance characteristics equivalent to a cold drawn bar of similar size, removing the scale from the bar, producing drilled nut blanks from said scaled bar, and then passing the blanks through a burnishing die to smooth and brighten the facets of the blanks.

3. A method for manufacturing nut blanks, comprising the steps of rolling a hexagon bar having geometrical and tolerance characteristics equivalent to a cold rolled or cold drawn bar of similar size, removing the scale from said bar by sand blasting, producing drilled nut blanks from said sanded bar, and then smoothing and polishing the sanded facets of the blank by die burnishing.

4. A method for manufacturing nut blanks, comprising the steps of rolling a hexagon bar having geometrical and tolerance characteristics equivalent to a cold rolled or cold drawn bar of similar size, removing the scale from said bar so as to avoid discoloration, cutting and drilling nut blanks from the scaled bar, and then smoothing and brightly polishing the sanded facets of the blanks by a burnishing operation without materially changing the shape of the blanks.

5. A method for manufacturing nut blanks, comprising the steps of hot rolling nut stock having shape, size and tolerance characteristics equivalent to an accurately shaped cold worked bar of similar size, sand blasting the bar to remove scale, producing chamfered and drilled nut blanks from said sanded bar, and then smoothing and brightly polishing the entire surfaces of the sanded facets of the blanks by a die burnishing operation.

6. A method for manufacturing nut blanks, comprising the steps of hot rolling a hexagon bar having shape, size and tolerance characteristics equivalent to a cold rolled or cold drawn bar of similar size, removing the scale from said bar by sand blasting, producing chamfered and drilled nut blanks from said sanded bar, and then passing said blanks through a die to effect a free and unobstructed longitudinal flow of the sanded surfaces of the blanks without the removal of metal or finning at the edges thereof.

7. A method for manufacturing nut blanks, comprising the steps of hot rolling a hexagon bar having accuracy in shape and size and tolerance characteristics equivalent to a cold rolled or cold drawn bar of similar size, removing the scale from said bar without staining, producing nut blanks from said scaled bar, and then brightly burnishing the facets of the blanks, whereby to produce a nut having a highly refined grain structure such as produced by working above the critical heat range, accuracy equivalent to and finish superior to a nut blank made from said cold worked stock.

8. A method of making nut blanks, comprising the steps of hot rolling an accurately shaped hexagon bar, removing the scale from said bar without staining so as to produce a bar having shape and tolerance characteristics equivalent to but slightly larger than a cold rolled or drawn bar adapted for the production of a nut of the same size, cutting and drilling nut blanks from said scaled bar, and then smoothly and brightly finishing the facets of the blanks by passing through a die without producing tears or burs at the top or bottom edges of the facets.

JAMES A. KINNEY.